(12) United States Patent
Miyamoto et al.

(10) Patent No.: US 8,439,795 B2
(45) Date of Patent: May 14, 2013

(54) APPARATUS FOR CONTROLLING MOTOR TORQUE

(75) Inventors: Hiroaki Miyamoto, Tokyo (JP); Yoshiaki Sano, Tokyo (JP); Takanori Sugimoto, Tokyo (JP); Norihiko Hatsumi, Tokyo (JP); Yasuyuki Hatsuda, Tokyo (JP); Akira Hashizaka, Tokyo (JP); Toshiyuki Matsumi, Tokyo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 21 days.

(21) Appl. No.: 13/209,600

(22) Filed: Aug. 15, 2011

(65) Prior Publication Data

US 2012/0071296 A1   Mar. 22, 2012

(30) Foreign Application Priority Data

Sep. 17, 2010  (JP) ................................. 2010-209732

(51) Int. Cl.
*B60W 10/08* (2006.01)
*B60W 10/18* (2012.01)

(52) U.S. Cl.
USPC ........................................... 477/27; 477/203

(58) Field of Classification Search .............. 477/27, 477/186, 203, 209
See application file for complete search history.

(56) References Cited

U.S. PATENT DOCUMENTS

| 2004/0204285 | A1 | 10/2004 | Ueno |
| 2009/0234524 | A1* | 9/2009 | Kim ................................. 701/22 |
| 2010/0004809 | A1 | 1/2010 | Itoh |
| 2010/0145588 | A1* | 6/2010 | Reuschel et al. ................. 701/70 |

FOREIGN PATENT DOCUMENTS

| EP | 1 065 115 A2 | 1/2001 |
| GB | 2 389 199 A | 3/2003 |
| JP | 2002-142302 A | 5/2002 |
| JP | 2004-320850 A | 11/2004 |
| JP | 2006-50811 A | 2/2006 |

OTHER PUBLICATIONS

European Search Report mailed Dec. 14, 2011.
Japanese Office Action issued in Japanese Patent Application No. 2010-209732 on Feb. 5, 2013.

* cited by examiner

*Primary Examiner* — Edwin A Young
(74) *Attorney, Agent, or Firm* — Birch, Stewart, Kolasch & Birch, LLP

(57) ABSTRACT

In a vehicle that generates creep torque using an electric motor, a controlling means that causes, on the basis of the results of the detecting by the vehicle speed detecting means and the braking operation detecting means, the electric motor to generate the creep torque, wherein if the brake is operated when the creep torque is generated, the controlling means decreases the creep torque by a first level, if the brake is not operated when the creep torque is generated, the controlling means increases or decrease the creep torque in a level range on the basis of the speed of the vehicle detected by the vehicle speed detecting means, and the first level is a decreasing level larger than a possible maximum decreasing level in the level range.

11 Claims, 3 Drawing Sheets

APPARATUS FOR CONTROLLING MOTOR TORQUE

BACKGROUND OF THE INVENTION

1) Field of the Invention

The present invention relates to an apparatus for controlling motor toque that controls torque of an electric motor of an electric vehicle or a hybrid electric vehicle when the motor generates creep torque.

2) Description of the Related Art

Recently, electric vehicles and hybrid electric vehicles that use electric motors (motors) as traveling sources have been developed and put into practical use in place of gasoline automobiles, which use internal combustion engines as traveling sources. An electric vehicle can arbitrarily control torque of the electric motor and can therefore controls, when the vehicle stops, the motor not to generate motor torque so that electric consumption can be saved. Also a hybrid electric vehicle, when the vehicle stopping, generates no motor torque to save electric consumption and concurrently stops the engine under so-called idle stop control.

In the meantime, a gasoline automobile including automatic transmission equipped with a conventional torque convertor generates creep torque caused from idling rotation of the engine when the engine rotates at a low speed. The creep torque allows the vehicle to travel at a low speed when parking and traveling in a traffic jam, only brake operation, i.e., not requiring accelerator operation. In addition, the creep torque can prevent the vehicle from moving backward when the brake is released for starting the vehicle on an upward slope, so that the operatively of the vehicle can be enhanced. At the present time, most vehicles put into the market are capable of creeping and therefore creeping is an necessary function for driving.

For the above, there has been developed a technique to generate creep torque by driving a motor of an electric vehicle and a hybrid electric vehicle. In this technique, generating motor torque when the brake pedal is pressed leads to wasting electric power. In order to avoid wasting electric power, the most effective solution is to make the motor torque zero under a state where the brake pedal is pressed. On the other hand, in response to a demand for creep torque, it is required to generate motor torque to satisfy the demand.

In relation to the above, Patent Literature 1 (Japanese Laid-Open Patent Publication No. 2004-320850) proposes a technique to generate motor torque corresponding to a status of pressing the brake. In this technique, when the vehicle speed is a predetermined value or less, when the accelerator opening is substantially zero, and when a status of pressing the brake is in the direction of increasing the braking force, the motor torque is rapidly reduced to zero while, when the status of pressing the brake is in the direction of decreasing the braking force, motor torque corresponding to an amount of depressing the brake is generated. Thereby, it is possible to save a waste electric consumption. Besides, since, when the vehicle starts moving on a steep upward slope, easing up on the brake causes the status of pressing the brake to be in the direction of decreasing the braking force, it is possible to prevent the vehicle from moving backward by generating motor torque corresponding to the amount of pressing the brake.

SUMMARY OF THE INVENTION

Here, the technique of Patent Literature 1 focuses on the problem that, if motor torque is generated after pressing of the brake is released, the generation of motor torque is not sufficient and therefore the vehicle moves backward on an upward slope. The problem is solved if the motor torque rapidly rises in response to releasing the brake. That makes it possible to further decrease motor torque for generating creep torque, which further saves waste electric consumption.

The object of the present invention is to provide an apparatus for controlling motor torque to be applied to a vehicle which is capable of generating creep torque by means of a electric motor which apparatus saves the electric consumption of the motor to generate creep torque by reducing unnecessary creep torque while ensuring necessary creep torque.

An apparatus of the present invention for controlling motor torque of a vehicle including an electric motor that generates creep torque includes vehicle speed detecting means that detects a speed of the vehicle; braking operation detecting means that detects a status of operating a brake; and controlling means that causes, on the basis of the results of the detecting by the vehicle speed detecting means and the braking operation detecting means, the electric motor to generate the creep torque, wherein if the brake is operated when the creep torque is generated, the controlling means decreases the creep torque by a first level (an amount of or a rate of change in the creep torque), if the brake is not operated when the creep torque is generated, the controlling means increases or decrease the creep torque in a level range (a range of the amount of or the rate of change in the creep torque) on the basis of the speed of the vehicle detected by the vehicle speed detecting means, and the first level is a decreasing level larger than a possible maximum decreasing level in the level range.

The apparatus for controlling motor torque of the present invention increases or decreases the creep torque according to operation of the brake and the speed of the vehicle when the creep torque is generated. Consequently, unnecessary creep torque can be eliminated, smoothly adjusting the creep torque to ensure necessary creep torque. Thereby, it is possible to properly save the electric consumption of the motor to generate the creep torque. In addition, if the brake is operated when the creep torque is generated, the creep torque is relatively largely decreased, so that unnecessary creep torque can be smoothly and rapidly eliminated.

It is preferable that, assuming that the brake is not operated when the creep torque is generated: if the vehicle stops, the controlling means decreases the creep torque; if the vehicle moves backward, the controlling means increases the creep torque; and if the vehicle moves forward, the controlling means decreases the creep torque.

Thereby, it is possible to ensure necessary creep torque and to eliminate unnecessary creep torque.

It is preferable that the first level and a second level in the level range of increasing or decreasing the creep torque are classified into at least three steps of large, middle, and small; if the brake is operated when the creep torque is generated, the controlling means decreases the creep torque by the large level as the first level; and if the brake is not operated when the creep torque is generated, the controlling means decreases the creep torque by the small level when the vehicle stops, increases the creep torque by the middle level when the vehicle moves backward, and decreases the creep torque by the middle level when the vehicle moves forward.

Thereby, it is more precisely possible to ensure necessary creep torque and to eliminate unnecessary creep torque.

It is preferable that the apparatus further includes accelerator operating detecting means that detects a status of operation of an accelerator, and that the controlling means increases, on the basis of the result of the detecting by the accelerator operating means, if the accelerator operating detecting means detects that accelerator is operated when the creep torque is generated, the creep torque by the large level.

This configuration makes it possible to rapidly and smoothly reach a motor torque corresponding to the operation of the accelerator, which contribute to improvement in driver's feeling when driving the vehicle.

It is preferable that, if the accelerator operating detecting means detects that accelerator is operated when the creep torque is generated, the controlling means sets the creep torque to be transient output torque until the output torque reaches one corresponding to an amount of operating the accelerator.

This configuration makes it possible to rapidly and smoothly reach a motor torque corresponding to output torque corresponding to an amount of operating the accelerator.

It is preferable that the controlling means sets an upper limit of the creep torque, the upper limit of the creep torque increasing as the speed of the vehicle lowers; and that the upper limit of the creep toque is set on the basis of the speed of the vehicle detected by the vehicle speed detecting means.

Thereby, it is possible to provide proper creep torque required to match the speed of the vehicle.

It is preferable that the apparatus further includes accelerator operating detecting means that detects a status of operation of an accelerator, and that the controlling means determines, on the basis of the results of detecting by the vehicle speed detecting means and the accelerator operating detecting means, whether creep torque condition that the vehicle is moving at a low speed and the accelerator is not operated is satisfied, and causes the electric motor to generate the creep torque when the creep torque condition is satisfied except for a transition state.

Thereby, it is possible to ensure necessary creep torque and to reduce unnecessary creep torque.

Preferably, the first level and a second level in the level range, the second level being classified into at least three steps of large, middle, and small of increasing or decreasing the creep torque, each corresponds to an amount of or a rate of change in the creep torque.

Accordingly, the level of the creep torque can be controlled by a constant amount or a constant ratio, so that the motor torque can be easily controlled.

DESCRIPTION OF THE PREFERRED EMBODIMENTS

Hereinafter, an embodiment of the present invention will now be described with reference to the accompanying drawings.

Figure 1:
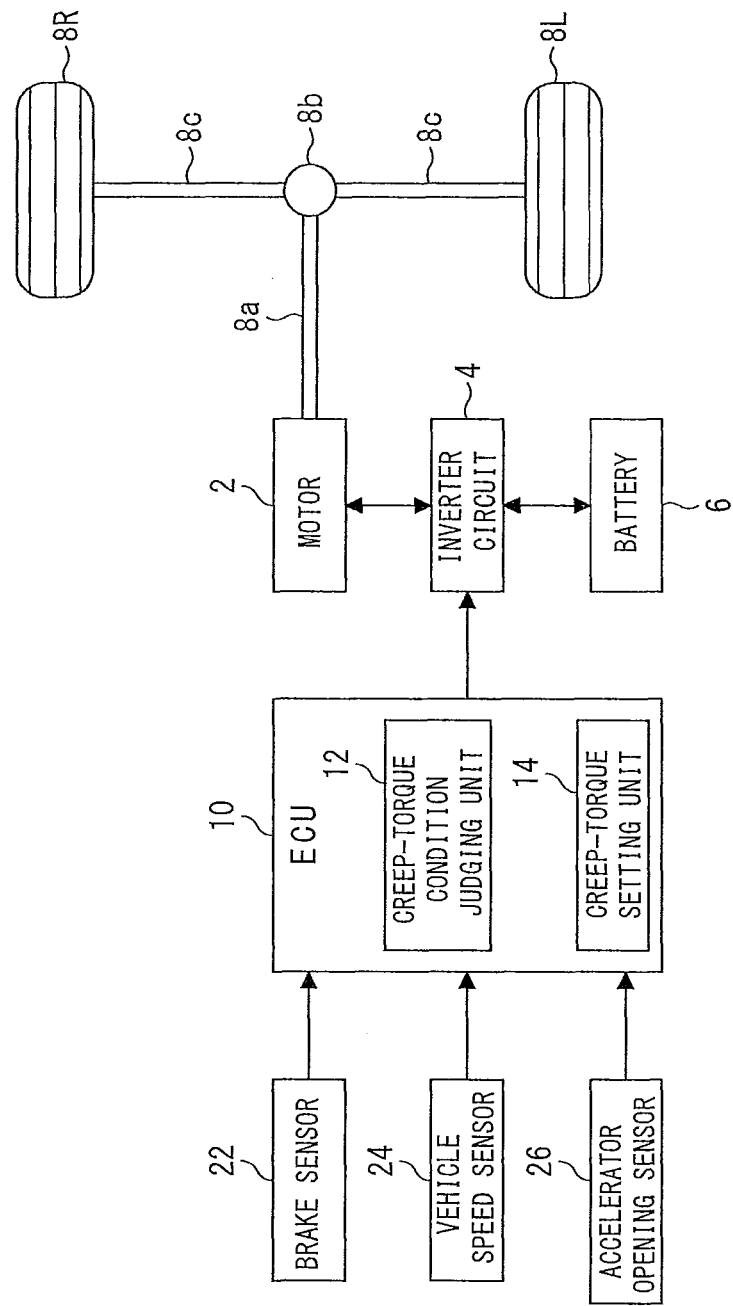
FIG. 1 is a diagram illustrating an apparatus for controlling motor torque according to an embodiment of the present invention in conjunction with the driving system of the vehicle.
Figure 2:
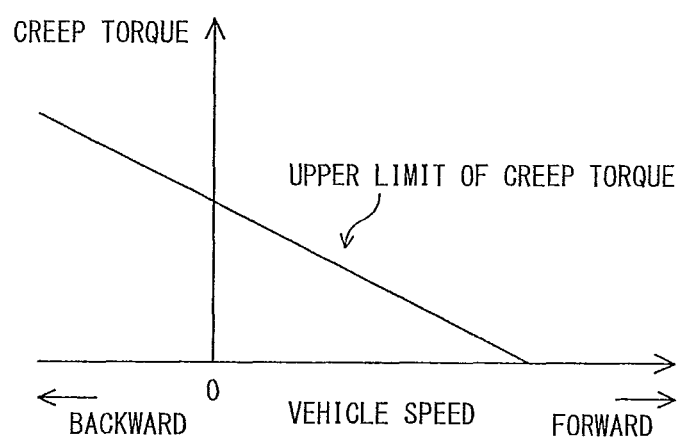
FIG. 2 is a graph illustrating characteristic of creep torque of motor torque control of the embodiment.
Figure 3:
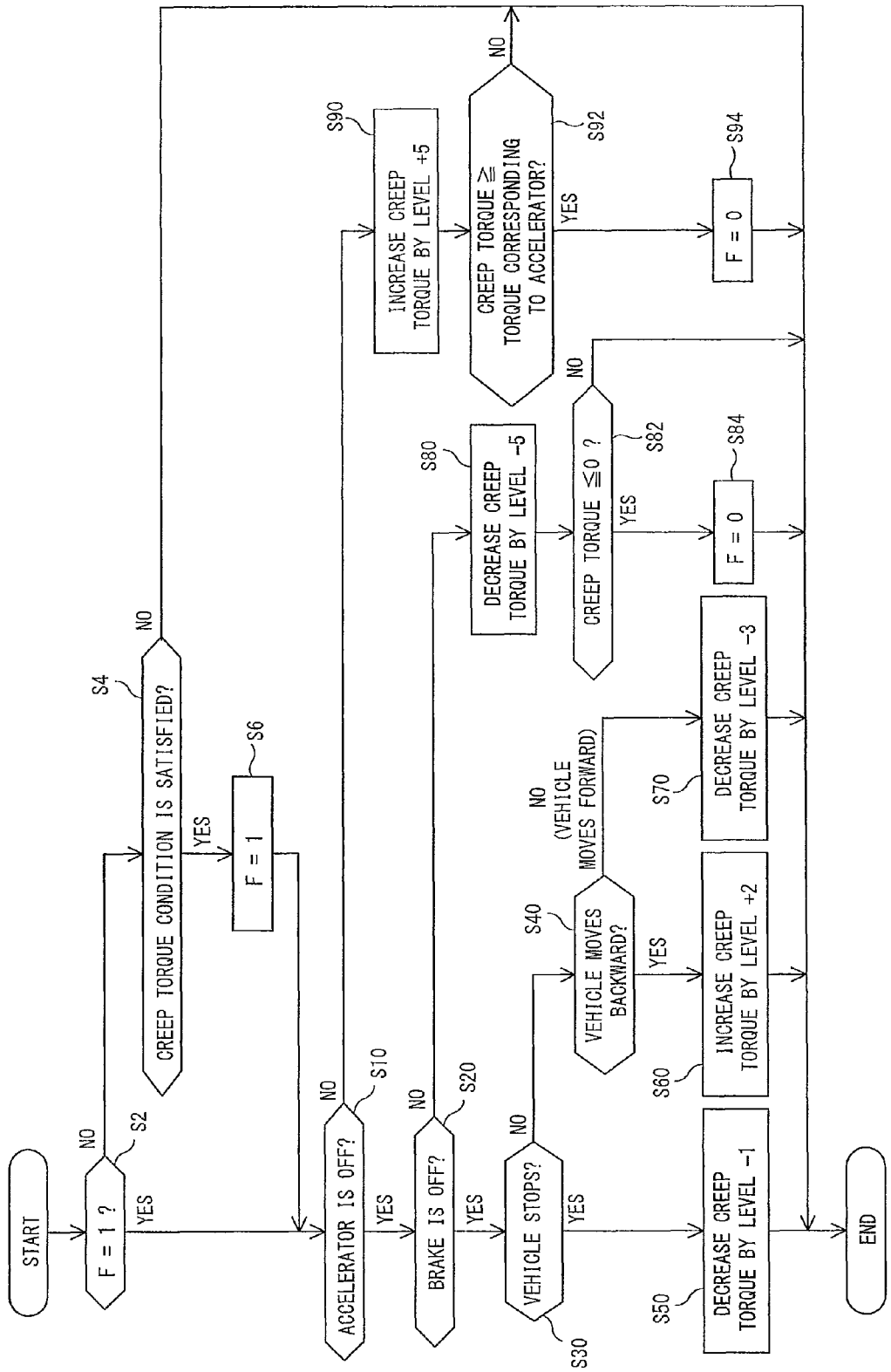
FIG. 3 is a flow chart illustrating a succession of procedural steps of controlling by the apparatus for controlling motor torque of the embodiment.

FIGS. 1-3 describe the embodiment of the present invention: FIG. 1 illustrates an apparatus for controlling motor torque in conjunction with the driving system of the vehicle; FIG. 2 is a graph illustrating characteristic of a creep torque of a motor torque control; and FIG. 3 is a flow chart illustrating a succession of procedural steps of the motor torque control.

As illustrated in FIG. 1, the embodiment is applied to an electric vehicle, which travels by transmitting rotational torque generated by an electric motor (hereinafter called "motor") 2 through, in succession, a motor rotating shaft or power transmitting shaft 8a, a differential gear 8b, and a driving shaft 8c, to the left and right driving wheels 8L and 8R.

The motor 2 functions as a motor and a generator, and the operation thereof is controlled by an inverter circuit 4. When the vehicle is driven by force generated by the motor 2, the inverter circuit 4 supplies electric power from a battery 6 to the motor 2 and causes the motor 2 to generate required driving torque under a power running state. In the meantime, under a regeneration state, the inverter circuit 4 causes the motor 2 to function as a generator, which generates a required regenerative control torque, and charges the battery 6 with the generated electric power.

In order to control the motor 2, an Electronic Control Unit (ECU) 10 serving as control means is provided. The ECU 10 includes an Input/Output device, a storing device (e.g., a ROM, a RAM, and/or a non-volatile RAM), a Central Processor Unit (CPU), and a timer counter.

The ECU 10 determines such a required driving torque and a required regenerative control torque of the motor 2 in accordance with the driving operation by the driver and the traveling state of the vehicle, and sends signals corresponding to the determination to the inverter circuit 4. Besides, the ECU 10 determines whether or not creep torque condition is satisfied, and if the creep torque condition is satisfied, causes the motor 2 to generate creep torque in accordance with various conditions.

The ECU 10 includes a function (creep torque condition judging unit) 12 that judges, on the basis of various pieces of information detected by a vehicle speed sensor (vehicle speed detecting means) 24 that detects speed of the vehicle, an accelerator opening sensor (accelerator operation detecting means and accelerator operating amount detecting means) 26 that detects an amount of operating (opening) of the accelerator pedal, whether the creep torque condition is satisfied at intervals of a predetermined control cycle; and a function (creep torque setting unit) 14 that sets, if the creep torque condition is judged to be satisfied, a creep torque on the basis of a piece of information detected by a brake sensor (braking operation detecting means) 22 that detects whether the brake pedal is operated.

The vehicle speed sensor (vehicle speed detecting means) 24 may be a wheel speed sensor that detects the rotational speed (wheel speed) of a driven wheel, or a motor rotational speed sensor that detects the rotational speed of the motor 2 correlated with the wheel speed.

In this embodiment, the brake pedal is judged to be operated (braking) if an amount of operating of the brake pedal detected by the brake sensor 22 serving as the braking operation detecting means that detects the amount of operating of the brake pedal is a predetermined value or more while if the amount of operating of the brake pedal is less than the predetermined value, the brake pedal is judged not to be operated (not braking). Alternatively, this judgment may be based on detection by a brake switch that detects whether the brake pedal is operated (i.e., whether the brake pedal is operated by a predetermined amount or more) or a sensor that detects a hydraulic pressure (e.g. a braking oil pressure) varying with braking operation, and that determines, if the hydraulic pressure comes to be a state of the pressure of braking, that the vehicle is judged to brake.

The above creep torque condition is that, except for a transition state, the vehicle travels at low speed (i.e. in a state close to a stop) and concurrently the accelerator is not operated. The creep-torque condition judging unit 12 judges whether the vehicle travels at a predetermined speed or lower (i.e. in a state close to stopping) on the basis of the value detected by the vehicle speed sensor 24, and further judges that the accelerator is not operated on the basis of whether the accelerator opening is zero or substantially zero. If both conditions are satisfied, the creep-torque condition judging unit 12 judges that the creep torque condition is satisfied.

If the creep torque condition is satisfied, the creep-torque setting unit 14 increases or decreases the creep torque in accordance with whether the brake is not operated, further in accordance with, if the brake is not operated, the speed status of the vehicle (i.e., whether the vehicle stops, moves backward, or moves forward), and the ECU 10 controls the output torque of the motor 2 to be the set creep torque. Since the speed status of the vehicle changes with the magnitude of the creep torque, the setting of increasing and decreasing the creep torque corresponds to so-called feedback control.

Specifically, if the brake is operated when creep torque is generated, the creep-torque setting unit 14 decreases the creep torque by level 5 (decreasing level) from the value set as the previous control cycle; if the brake is not operated and the vehicle stops when creep torque is generated, the creep-torque setting unit 14 decreases the creep torque by level 1 (decreasing level) from the value set as the previous control cycle; if the brake is not operated and the vehicle moves backward when the creep torque is generated, the creep-torque setting unit 14 increases the creep torque by level 2 (increasing level) from the value set as the previous control cycle; and if the brake is not operated and the vehicle moves forward when the creep torque is generated, the creep-torque setting unit 14 decreases the creep torque by level 3 (decreasing level) from the value set as the previous control cycle.

In other words, if the brake is not operated when creep torque is generated, the creep-torque setting unit 14 increases or decreases the creep torque within a predetermined level range (a level range) on the basis of the vehicle speed detected. In the meantime, a decreasing level (the first level) of the creep torque when the brake is operated concurrently with generation of creep torque is larger than the maximum level (a possible maximum decreasing level) by which the creep torque can be decreased in the predetermined level range, so that, when the brake is operated, the creep torque is reduced as soon as possible. A second level in the predetermined level range is classified into a number of levels each by the creep torque is increased or decreased.

However, if the brake is operated, the creep torque condition is not satisfied. For this reason, if the brake is operated when creep torque is generated, the creep-torque setting unit 14 sets the creep torque as a transient output torque until the creep torque comes to be "0".

Furthermore, if the accelerator is operated when creep torque is generated, the creep-torque setting unit 14 increases the creep torque by level 5 (increasing level) from the value set as the previous control cycle. However, since, when the accelerator is operated, the motor 2 is controlled to generate an output torque corresponding to the amount of operating the accelerator, the creep-torque setting unit 14 sets, if the accelerator is operated when creep torque is generated, the creep torque to be a transient output torque until the motor 2 generates an output torque corresponding an amount of operating the accelerator.

Here, description will now be made in relation to a level of increasing and decreasing (the creep torque. In this embodiment, the ECU 10 sets and controls the creep torque at a predetermined control cycle, so that the level of incasing or decreasing corresponds to an amount of increasing or decreasing creep torque. An increasing or decreasing unit is set for an amount of increasing or decreasing creep torque. Specifically, increase or decrease by level 1 represents increase or decrease of one unit; increase or decrease by level 2 represents increase or decrease of two units; increase or decrease by level 3 represents increase or decrease of three units; increase or decrease by level 4 represents increase or decrease of four units; and increase or decrease by level 5 represents increase or decrease of five units. Accordingly, for example, if the brake is operated when the creep torque is generated, the creep torque is lowered by level 5, which is five times larger than amount of decreasing by level 1 when the brake is not operated and concurrently the vehicle stops as generation of the creep torque.

As illustrated in FIG. 2, the creep-torque setting unit 14 sets the upper limit of the creep torque which limit increases as the speed of the vehicle lowers. The creep torque is set in the range of from the lower limit of 0 (zero) to the upper limit. The upper limit of the creep torque is determined to be the sum of a value required for the speed of the vehicle and a margin. FIG. 2 is an example that the upper limit of the creep torque linearly increases as the speed of the vehicle lowers, but the fluctuation of the upper limit in relation to lowering the speed of the vehicle is not limited to the example of FIG. 2.

The creep-torque setting unit 14 increases and decreases the creep torque control at a control cycle such that the value of the creep torque is in the range of from the lower limit zero to the above upper limit. Accordingly, setting increase and decrease of creep torque at a control cycle corresponds to setting the velocity of approaching the upper limit when the creep torque is controlled to be increased and the velocity of approaching the lower limit when the creep torque is controlled to be decreased.

The apparatus for controlling vehicle motor torque in this embodiment of the present invention has the above configuration and controls the creep torque that the motor 2 generates as illustrated in FIG. 3. The succession of procedural steps of FIG. 3 is carried out in the single predetermined control cycle. In FIG. 3, the symbol "F" represents a flag of the creep torque condition: if the creep torque condition is satisfied, the flag is set to be "1"; and if the creep torque is not satisfied, the flag is set to be "0".

For the beginning, the creep torque condition flag is judged to be "1" (step S2), and, if the flag F is set to "1", the procedure proceeds to step S10. If the flag F is not set to "1", a judgment whether the creep torque condition is satisfied is made (step S4). The creep torque condition is that the vehicle moves at a low speed and concurrently the accelerator is not operated. If the condition is satisfied, the flag F is set to "1" (step S6) and the procedure proceeds to step S10. On the other hand, if the condition is not satisfied, the current control cycle is terminated.

In step S10, a judgment whether the accelerator is not operated (i.e., whether the accelerator is off) is made. If the procedure undergoes steps S4 and S6, the accelerator is off. However, if the flag F is judged to be "1" in step S2, in other words, if the creep torque condition is satisfied (i.e., is not unsatisfied) in the previous control cycle, there is a possibility of judging that the accelerator is on in the current control cycle. In this case, the accelerator is judged not to be off (i.e., judged to be on) in step S10 and the procedure proceeds to step S90.

In step S90, the creep torque is increased from the value of the previous control cycle by level 5. In the ensuing step S92, a judgment whether the increased creep torque is judged to be equal to or more than a torque corresponding to the accelerator (i.e., torque corresponding to the accelerator opening) is made. If the increased creep torque is judged to be equal to or more than the torque corresponding to the accelerator, the flag F is set to "0" (step S94) and the current control cycle is terminated. On the other hand, if the creep torque is not equal to or more than the torque corresponding to the accelerator, the current control cycle is terminated without making any change (i.e., the flag "F" remains "0").

The processing of steps S90, S92, and S94 makes the output torque of the motor 2 possible to rapidly and smoothly reach, if the accelerator is operated when the creep torque is generated, an output torque corresponding to the amount of operating the accelerator. Consequently, the control of the creep torque can be terminated.

In contrast, if the accelerator is judged to be off in step S10, the procedure proceeds to step S20 where a judgment whether the brake is not operated (i.e. whether the brake is off) is made. If the brake is judged to be operated (i.e. to be on), the procedure proceeds to step S80.

In step S80, the creep torque is decreased by level 5 from the value of the previous control cycle. In the ensuing step S82, a judgment whether the decreased creep torque is zero or less is made. If the creep torque is zero or less, the flag F is set to "0" (step S84) and the current control cycle is terminated. In contrast, if the creep torque is not zero or less, the current control cycle is terminated without any change (i.e., the flag F remains "0").

The processing of steps S80, S82, and S84 makes the creep torque possible to rapidly and smoothly decrease to "zero" if the brake is operated when the creep torque is generated, so that the control of the creep torque can be terminated.

In step S20, the brake is judged to be off, the traveling status (stops, moves backward, or moves forward) of the vehicle is judged from the value detected by the vehicle speed sensor 24 (steps S30 and S40). If the vehicle is stops, the procedure moves from step S30 to step S50 where the creep torque is decreased by level 1 from the value of the previous control cycle and the current control cycle is terminated.

If the vehicle moves backward, the procedure proceeds from step S30 through step S40 to step S60 where the creep torque is increased by level 2 from the value of the previous control cycle and then the current control cycle is terminated. At this time, the creep torque is however restricted not to exceed the upper limit of the creep toque.

If the vehicle moves forward, the procedure proceeds from step S30 through step S40 to step S70 where the creep torque is decreased by level 3 from the value of the previous control cycle and then the current control cycle is terminated. As described above, on the basis of whether the accelerator is operated, of whether the brake is operated, and also of the state of moving of the vehicle, the magnitude of the creep torque and the velocity of changing the creep torque (an amount of changing the creep torque per unit control cycle) are controlled.

Accordingly, if the vehicle stops, the creep torque is very gently decreased to the possible smallest creep torque. In particular, partly since the decrease of the creep torque is set to be as low as possible, partly since, even if the vehicle starts moving backward due to decrease of the creep torque, the speed of moving backward is extremely low, the backward moving of the vehicle can be inhibited by gently increasing the creep torque of the vehicle. Consequently, the electric consumption of the motor 2 can be saved by generating such minimum creep torque.

Once the vehicle starts moving backward, the creep torque increases gently but faster than decreasing the creep torque as the vehicle stops. For this reason, it is possible to avoid generation of excessive creep torque and concurrently avoid backward moving of the vehicle. Consequently, effective creep torque can be generated, saving electric consumption of the motor 2.

On the other hand, if the vehicle starts moving forward, the creep torque is relatively rapidly decreases. For this, the vehicle can be relatively soon prevented from moving forward, for which electric consumption of the motor 2 can be saved.

Accordingly, the vehicle when stopping on an upward slope can be inhibited from moving backward and the vehicle when stopping on a downward slope can be inhibited moving forward, saving electric consumption of the motor 2 due to generation of creep torque.

This embodiment of the present invention is described above. However, the present invention should by no means be limited to the foregoing embodiment. Various changes and modifications can be suggested without departing from the gist of the present invention.

For example, in the above embodiment, since the ECU 10 sets and controls the creep torque at a predetermined control cycle, the level of increasing or decreasing the creep torque corresponds to an amount of the increasing or decreasing, which may alternatively be a ratio of increasing or decreasing the creep torque (i.e., an amount of the increasing or decreasing per unit time). In this case, a unit of a rate of increasing or decreasing creep torque is set: increase or decrease by one level 1 represents increase or decrease of one unit; increase or decrease by level 2 represents increase or decrease of twice unit that is twice the one unit; increase or decrease by level 3 represents increase or decrease of triple unit that is triple the one unit; increase or decrease by level 4 represents increase or decrease of quadruple unit that is quadruple the one unit; and increase or decrease by level 5 represents increase or decrease of quintuple unit that is quintuple the one unit.

This case may not detect the speed of the vehicle, a brake operation status, and a status of accelerator operation at intervals of a predetermined control cycle. Alternatively, the speed of the vehicle, a brake operation status, and an accelerator operation status may be always monitored, and if the moving status of the vehicle is changed among stopping, moving forward, and moving backward, or if the brake or the accelerator is switched between on or off, a judgment whether the creep torque condition may be satisfied is made (step S4 of FIG. 3), a judgment whether the accelerator is on or off may be made (step S10 of FIG. 3), a judgment whether the brake is on or off may be made (step S20 of FIG. 3), a judgment whether the vehicle is stops, moves forward, or moves backward may be made (steps S30 or S40 of FIG. 3), or the level of increasing or decreasing creep torque may be set (steps S50, S60, S70, S80, and S90 of FIG. 3).

In the above embodiment, a level of increasing or decreasing creep torque is classified into five levels of from level 1 to level 5, but the classification of level is not limited to this.

Alternatively, a level of increasing or decreasing creep torque may be classified into large, medium, and small: if a brake is operated when the creep torque is generated, the level of decreasing the creep torque may be set to large; if a vehicle stops and the brake is not operated when the creep torque is generated, the level of decreasing the creep torque may be set to small; if the brake is not operated and the vehicle is moves backward when the creep torque is generated, the level of increasing the creep torque may be set to medium; and if the brake is not operated and the vehicle moves forward when the creep torque is generated, the level of decreasing the creep torque may be set to medium.

In this case, if the accelerator is operated when the creep torque is generated, the creep torque is preferably increased by a large level.

The creep torque condition may not be limited to one described in the above embodiment and satisfactorily includes at least the brake being not operated.

The above embodiment assumes that the vehicle is an electric vehicle, but the present invention can be applied to a hybrid electric vehicle.

The invention claimed is:

1. An apparatus for controlling motor torque of a vehicle including an electric motor that generates creep torque, the apparatus comprising:
   vehicle speed detecting means that detects a speed of the vehicle;
   braking operation detecting means that detects a status of operating a brake; and
   controlling means that causes, on the basis of the results of the detecting by the vehicle speed detecting means and the braking operation detecting means, the electric motor to generate the creep torque, wherein
   if the brake is operated when the creep torque is generated, the controlling means decreases the creep torque by a first level,
   if the brake is not operated when the creep torque is generated, the controlling means increases or decrease the creep torque in a level range on the basis of the speed of the vehicle detected by the vehicle speed detecting means, and
   the first level is a decreasing level larger than a possible maximum decreasing level in the level range.

2. The apparatus according to claim 1, wherein, if the brake is not operated when the creep torque is generated:
   if the vehicle stops, the controlling means decreases the creep torque;
   if the vehicle moves backward, the controlling means increases the creep torque; and
   if the vehicle moves forward, the controlling means decreases the creep torque.

3. The apparatus according to claim 2, wherein:
   the first level and a second level in the level range of increasing or decreasing the creep torque are classified into at least three steps of large, middle, and small;
   if the brake is operated when the creep torque is generated, the controlling means decreases the creep torque by the large level as the first level; and
   if the brake is not operated when the creep torque is generated, the controlling means decreases the creep torque by the small level when the vehicle stops, increases the creep torque by the middle level when the vehicle is moving backward, and decreases the creep torque by the middle level when the vehicle is moving forward.

4. The apparatus according to claim 3, further comprising accelerator operating detecting means that detects a status of operation of an accelerator, wherein
   the controlling means increases, on the basis of the result of the detecting by the accelerator operating means, if the accelerator operating detecting means detects that accelerator is operated when the creep torque is generated, the creep torque by the large level.

5. The apparatus according to claim 4, further comprising an accelerator operating amount detecting means detecting an amount of operating of the accelerator, wherein,
   if the accelerator operating detecting means detects that accelerator is operated when the creep torque is generated, the controlling means sets the creep torque to be transient output torque until the output torque reaches one corresponding to the amount of operating the accelerator.

6. The apparatus according to claim 5, wherein:
   the controlling means sets an upper limit of the creep torque, the upper limit of the creep torque increasing as the speed of the vehicle lowers; and
   the upper limit of the creep toque is set on the basis of the speed of the vehicle detected by the vehicle speed detecting means.

7. The apparatus according to claim 6, further comprising accelerator operating detecting means that detects a status of operation of an accelerator, wherein
   the controlling means determines, on the basis of the results of detecting by the vehicle speed detecting means and the accelerator operating detecting means, whether creep torque condition that the vehicle is moving at a low speed and the accelerator is not operated is satisfied, and causes the electric motor to generate the creep torque when the creep torque condition is satisfied except for a transition state.

8. The apparatus according to claim 7, wherein the first level and a second level in the level range, the second level being classified into at least three steps of large, middle, and small of increasing or decreasing the creep torque, each corresponds to an amount of or a rate of change in the creep torque.

9. The apparatus according to claim 1, wherein:
   the controlling means sets an upper limit of the creep torque, the upper limit of the creep torque increasing as the speed of the vehicle lowers; and
   the upper limit of the creep toque is set on the basis of the speed of the vehicle detected by the vehicle speed detecting means.

10. The apparatus according to claim 1, further comprising accelerator operating detecting means that detects a status of operation of an accelerator, wherein
    the controlling means determines, on the basis of the results of detecting by the vehicle speed detecting means and the accelerator operating detecting means, whether creep torque condition that the vehicle is moving at a low speed and the accelerator is not operated is satisfied, and causes the electric motor to generate the creep torque when the creep torque condition is satisfied except for a transition state.

11. The apparatus according to claim 1, wherein the first level and a second level in the level range, the second level being classified into at least three steps of large, middle, and small of increasing or decreasing the creep torque, each corresponds to an amount of or a rate of change in the creep torque.

* * * * *